United States Patent [19]

Lederman

[11] Patent Number: 4,932,508

[45] Date of Patent: Jun. 12, 1990

[54] OVERRUNNING ROLLER CLUTCH WITH PROTECTED SPRINGS

[75] Inventor: Frederick E. Lederman, Sandusky, Ohio

[73] Assignee: General Motors Corporation, Detroit, Mich.

[21] Appl. No.: 390,142

[22] Filed: Aug. 7, 1989

[51] Int. Cl.$^5$ ............................................. F16D 41/07
[52] U.S. Cl. ....................................... 192/45; 188/82.84
[58] Field of Search ................ 192/45, 44; 188/82.84

[56] References Cited

U.S. PATENT DOCUMENTS

| 3,500,977 | 3/1970 | Gehrke | 192/45 |
| 3,760,914 | 9/1973 | Gelbrich | 192/45 |
| 4,415,072 | 11/1983 | Shoji et al. | 192/45 |
| 4,712,661 | 12/1987 | Lederman et al. | 192/45 |

FOREIGN PATENT DOCUMENTS 3615231  11/1987  Fed. Rep. of Germany ........ 192/45

*Primary Examiner*—Rodney H. Bonck
*Attorney, Agent, or Firm*—Patrick M. Griffin

[57] ABSTRACT

An accordion type roller energizing springs has resilient auxiliary spring fingers stamped out of each leaf to act as stops to prevent overcompression, as well as providing extra restoring force when the roller moves back out of the normal travel path.

3 Claims, 3 Drawing Sheets

OVERRUNNING ROLLER CLUTCH WITH PROTECTED SPRINGS

This invention relates to overrunning roller clutches in general, and specifically to such a clutch in which the springs are self protected against overcompression.

BACKGROUND OF THE INVENTION

The rollers in overrunning roller clutches normally move circumferentially over a limited travel path as compressed energizing springs maintain the rollers at a lockup ready position near the narrow end of a plurality of roller wedging pockets. The springs compensate for race running eccentricity, which continually widens and narrows the wedging pockets, in a manner well known to those skilled in the art. But such clutches are also subject to various disturbing forces that may push any given roller back beyond and out of the normal travel path, toward the wide end of the wedging pocket. When this occurs, the roller may actually temporarily lose contact with the race surfaces, and its spring is compressed beyond the normal compression limit. While the spring provides a restoring force to push the roller back, some clutch designs provide blocking devices to limit roller movement, and prevent the spring from overcompressing. For example, a shelf on the clutch cage may hit the roller if it moves back too far, or a sleeve over the spring may hit the cage before the spring over compresses. Either approach protects the spring, but at the cost of potential impact damage to the cage, the roller, or both.

SUMMARY OF THE INVENTION

The invention provides an overrunning roller clutch with springs that are protected against overcompression, but in a way that is entirely internal to the spring and independent of the cage. In the preferred embodiment disclosed, the clutch includes a conventional cage and rollers. Each roller energizing spring is the accordion type, with a series of flat leaves, each joined to an adjacent leaf in a general V shape by a resilient fold or pleat. The resilience in the pleats provides the basic spring force when the spring is compressed. Each spring also has an auxiliary spring finger lanced out of it, which extends out from a live hinge at a shallow angle to a finger end. The finger end normally does not contact the adjacent leaf, so the spring behaves just like a conventional spring, so long as the roller does not move out of the normal travel path. But when the roller moves back far enough, and the spring is compressed far enough, the finger ends do hit the adjacent leaves. This bends the fingers about the live hinges, which are resilient enough that the fingers prevent the spring from overcompressing, protecting the pleats against overstress. The added resilience of the fingers also provides additional restoring force to push the rollers back into the normal travel path. The spring is the same size and shape as a conventional spring, and uses no more material.

It is, therefore, a general object of the invention to provide an energizing spring in a roller clutch that is internally protected against overcompression.

It is another object of the invention to provide such a spring that provides extra restoring force to the roller when the roller moves out of the normal travel path.

It is another object of the invention to provide an improved accordion type roller energizing spring in which auxiliary spring fingers stamped out of spring leaves serve both to protect the pleats against overcompression, and to provide extra roller restoring force.

DESCRIPTION OF THE PREFERRED EMBODIMENT

These and other objects and features of the invention will appear from the following written description, and from the drawings, in which.

Figure 1:
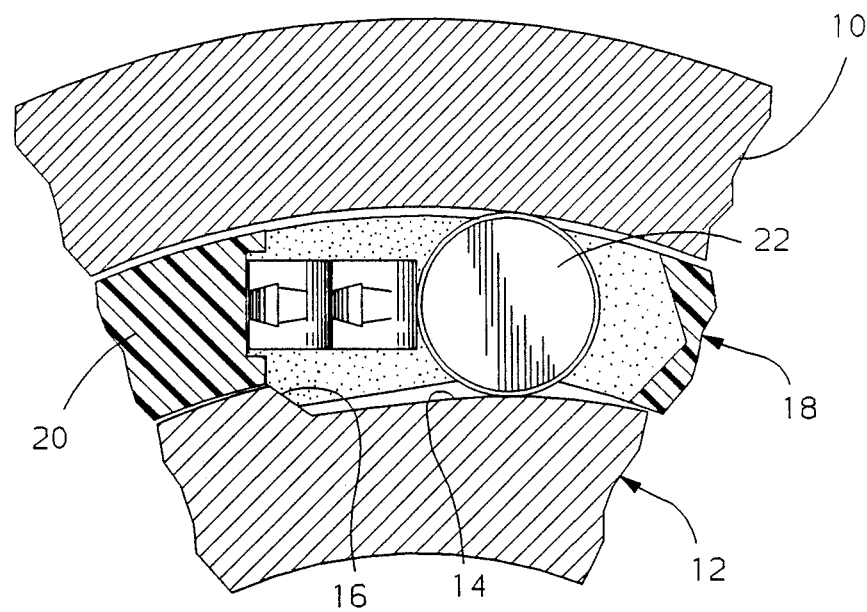
FIG. 1 is an end view of a section of a pair of clutch races, showing a conventional cage in cross section, one roller, and showing the general location of an energizing spring schematically.

Referring first to FIG. 1, any overrunning roller clutch is located in the annular space between a pair of clutch races, a pathway race 10 and a cam race, designated generally at 12. Cam race 12 has a series of long sloped cam ramps 14, and short, oppositely sloped cam hooks 16, which, together with pathway race 10, define a series of roller wedging pockets. A roller retention cage, designated generally at 18, has a series of journal blocks 20 that fit fairly closely between the races 10 and 12, maintaining them in a substantially coaxial or concentric relation. However, some clearance has to be left between the journal blocks 20 and the races 10 and 12, so that cage 18 can be installed without binding. This radial clearance creates some inevitable running eccentricity between the races 10 and 12, which causes the cam ramp 14 to move closer to and farther from the pathway race 10, often with a high frequency. Selective relative rotation between the races 10 and 12 is provided for by a complement of cylindrical steel rollers, one of which is illustrated at 22. Cage 18 confines the rollers 22 axially between the races 10 and 12. Each roller 22 jams between a cam ramp 14 and pathway race 10 if pathway race 10 attempts to rotate clockwise relative to cam race 12, which is called lockup. Roller 22 is maintained in a lockup ready position, in continual contact with both its cam ramp 14 and pathway race 10, by an energizing spring, the location of which is indicated by the crossed box. Any energizing spring would generally be located there, between a journal block 20, or the equivalent, and a respective roller 22. More about the maintenance of lockup ready position is described next.

Figure 3:
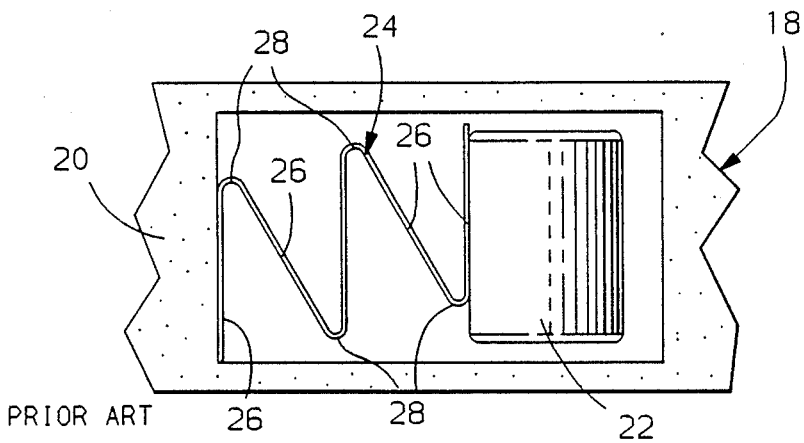
FIG. 3 is a view of a conventional roller and spring at the forward point of a normal travel path.
Figure 4:
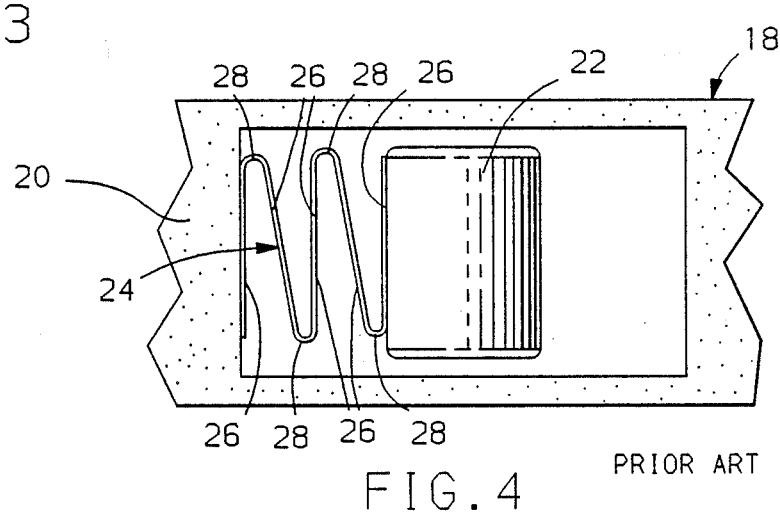
FIG. 4 is the same as 3, but showing the rearward point in the normal travel path.
Figure 5:
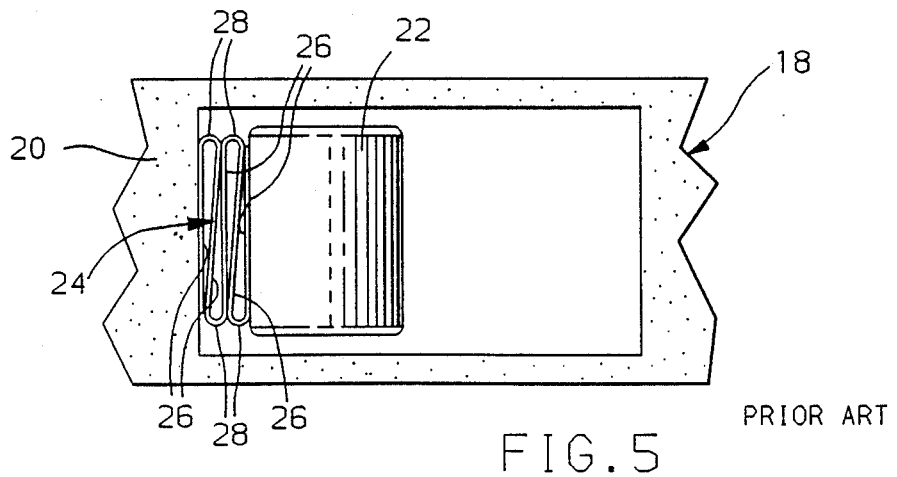
FIG. 5 is the same as 4, but showing the roller and spring moved back beyond the normal rearward point in the travel path.

Referring next to FIGS. 3 through 4, a conventional roller clutch spring, indicated generally at 24, is shown incorporated with cage 18 and roller 22. Spring 24 is the type generally known as an accordion spring, which is stamped from flat spring stock with a series of flat leaves 26 joined at pleats 28 into a series of V shaped loops. It is the folds or pleats 28 that are the active part of spring 24, that is, the part that provides the resilience spring force to spring 24. Leaves 26 merely join the pleats 28 together. Spring 24 biases roller 22 continually to ready position. However, because of the race eccentricity described above, the ready position of roller 22 is not a single position as such, but an ever changing equilibrium position located within a certain limited path. The forwardmost point in the normal travel path of roller 22 is shown in FIG. 3, and the rearwardmost point in FIG. 4. Spring 24 is continually compressing and expanding as roller 22 travels. The adjacent leaves 26 move toward and away from one another, and the pleats 28 are always under some compression. So long as roller 22 stays within the normal travel path limits, the pleats 28 are not overstressed. However, roller 22, if subjected to a sufficient disturbing force, can be shifted forcefully back, beyond the FIG. 4 position. This is shown occurring in FIG. 5. Such a disturbing force could occur from roller 22 hitting an obstruction on its cam ramp 14, such as a grain of sand, or in other ways, as will be well understood by those familiar with the art. As such, spring 24 may be over compressed to the point where the pleats 28 contact one another, as shown, which may stress the pleats 28 beyond their elastic limit. Cam hook 16 represents some limit on how far spring 24 may be compressed, or a shelf could be provided on journal block 20 to hit roller 22. Neither is an entirely desirable alternative, however, for the reasons outlined above.

Figure 2:
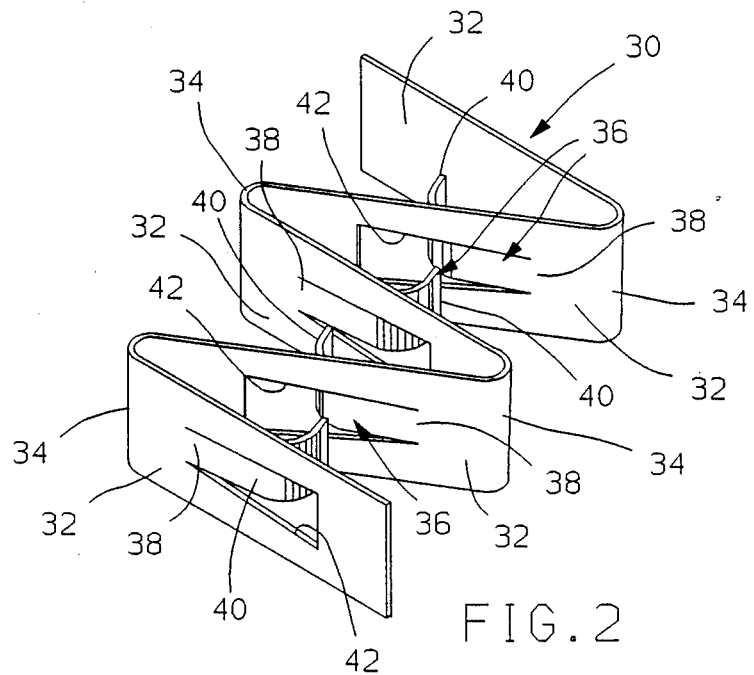
FIG. 2 is a perspective view of a preferred embodiment of the spring of the invention.

Referring next to FIG. 2, a preferred embodiment of the spring of the invention, indicated generally at 30, is shown in its pre-installation, free state. Like spring 24, spring 30 is an accordion spring, with flat leaves 32 joined at pleats 34 into V shaped loops. In addition, however, spring 30 has an auxiliary spring finger, indicated generally at 36, stamped or lanced out of every leaf 32 except the rear one. Each spring finger 36 includes a live hinge 38 where it is integral with its leaf 32, and extends out from there at a shallow angle to a curved, inturned finger end 40. Each finger end 40 is spaced from the adjacent leaf 32, for a reason described below. Although the leaves 32 do not perform any function other than connecting the active pleats 28, at least in a conventional spring, they are also spring stock. Consequently, the live hinge 38 is also resilient, like pleat 28. It will also be noted that the spring fingers 36, although identical in shape, alternate as to their angular orientation relative to their respective leaves 32. Furthermore, each finger 36 is tapered continually, increasing in width all the way from hinge 38 to end 40, as is the residual slot 42 in its leaf 32, for a reason described next.

Figure 6:
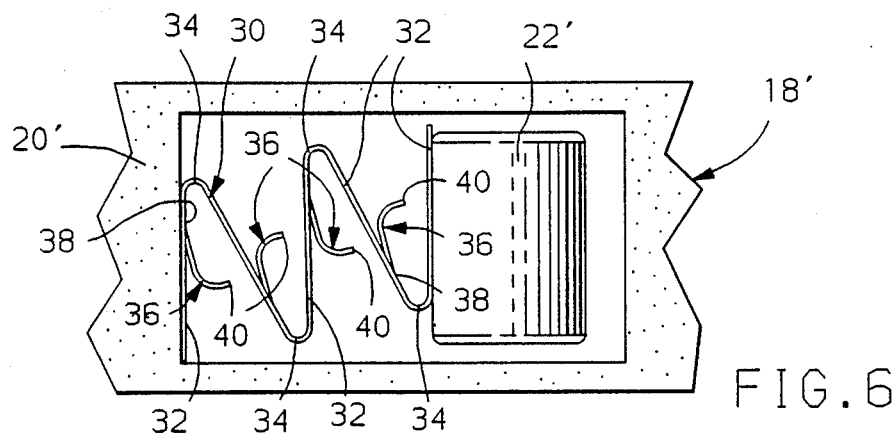
FIG. 6 is a view of the invention corresponding to 3.
Figure 7:
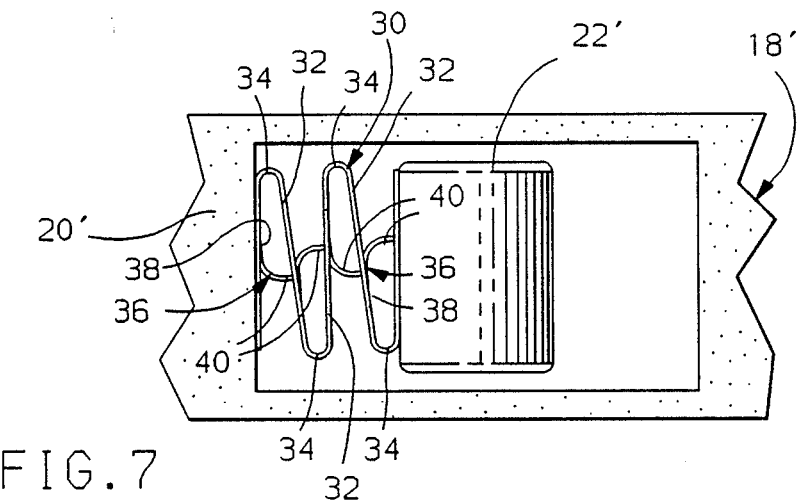
FIG. 7 is a view of the invention, corresponding to 4.

Referring next to FIGS. 6 and 7, a clutch 44 incorporating the improved spring 30 of the invention, uses the same cage and rollers, indicated with the same number primed ('). FIG. 6 shows the forward point of the normal travel path of roller 22', with spring 30 compressed somewhat from its free state. The finger ends 40 are still spaced away from the adjacent leaves 32. FIG. 7 shows the rearward point of the normal travel path, and the adjacent leaves 32 have moved far enough toward one another that the finger ends 40 have begun to make contact. Since the fingers 36 are continually tapered, and since they alternate as to direction, as noted above, it is assured that no finger end 40 can slip through the slot 42 of the adjacent leaf 32 when it makes contact.

Figure 8:
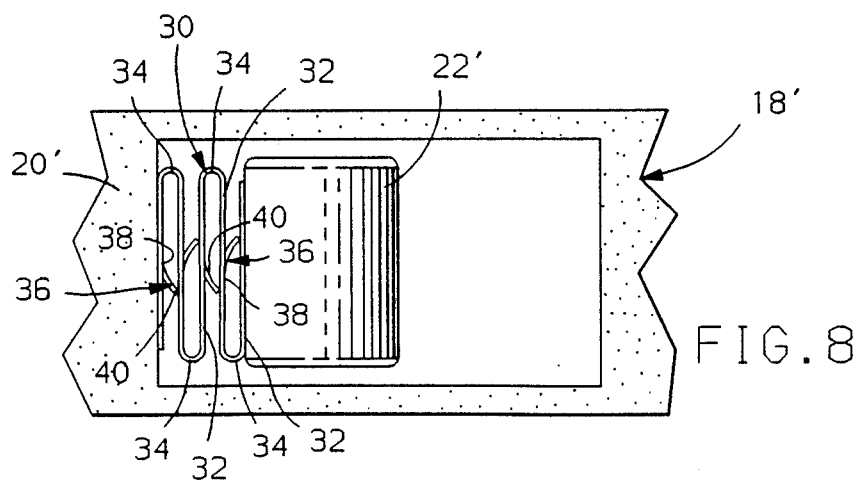
FIG. 8 is a view of the invention corresponding to FIG. 5.

Referring next to FIG. 8, when roller 22' is subjected to a force that shifts it back beyond the FIG. 7 position, the finger ends 40 slide down the adjacent leaves 32 with which they are in contact, and the fingers 36 are bent and flexed about the live hinges 38. In addition, the curved finger ends 40 bend back to an extent. The shape and orientation of the fingers 36 still assures that the finger ends 40 do not slip through the sots 42 in the adjacent leaves 32. The resilience of the hinges 38, and the resistance of the curved finger ends 40 to bending back, together are sufficient to prevent the spring 30 from overcompressing, as conventional spring 24 could. Pleats 34 do not stack up on one another, and are protected against overstress. Roller 22' does not shift as far out of the normal travel path as roller 22, either. In addition, the extra resilience added by the bending of the hinges 38 and finger ends 40 together a good deal of extra restoring force to shift roller 22' out of the FIG. 8 position and back within the normal travel path. The overcompression protection thus provided is entirely internal to spring 30, so roller 22' does not have to hit the cam hook 16, or any part of cage 18', in order to limit its motion. Spring 30 fits within the same envelope as conventional spring 24, and uses no more material, while cooperatively providing the advantages noted.

Variations of the embodiment disclosed may be made. An accordion spring with either radial pleats, as shown, or with axial pleats, could incorporate the improvement of the invention. Instead of the resilient fingers 36, a non-resilient projection that extended from one leaf toward an adjacent leaf would act as a stop to prevent spring overcompression, although it would not provide any extra restoring force. Since the spring stock from which leaves 32 are formed is already resilient, it is a practical advantage to form the fingers 36 so as to provide for the extra restoring force as well. A single spring finger 36 could be provided to protect a single pleat 34. Such a single finger could be of any shape, but the particular, nonslip through tapered shape and orientation of the fingers 36 disclosed allows multiple spring fingers to be easily provided to protect all pleats 34. Multiple spring fingers 36 also help prevent the spring loops from nesting together when the springs 30 are shipped. The finger ends 40 could be simply straight, as the bending of the hinges 38 alone would likely provide enough extra resilience in most applications. Therefore, it will be understood that it is not intended to limit the invention to just the embodiment disclosed.

The embodiments of the invention in which an exclusive property or privilege is claimed are defined as follows:

1. An overrunning roller clutch of the type in which each of a plurality of rollers located between a pair of clutch races travels back and forth over a normal travel path, but is subject to disturbing forces moving it beyond said normal travel path, said clutch comprising,
    a roller retention cage adapted to be installed between said races, and,
    a plurality of accordion type energizing springs mounted to said cage, each of which has a series of leaves joined to an adjacent leaf at a resilient pleat, each of said springs being compressed against a respective roller so as to normally bias it toward an equilibrium position within said normal travel path, at least one of said spring leaves further including a projection formed therein and extending toward an adjacent leaf to an end spaced away from said adjacent leaf sufficiently far so as to contact said adjacent leaf only when said roller moves beyond said normal travel path,
    whereby, when said projection end contacts said adjacent leaf, the pleat between said leaves is protected against overcompression.

2. An overrunning roller clutch of the type in which each of a plurality of rollers located between a pair of clutch races travels back and forth over a normal travel path, but is subject to disturbing forces moving it beyond said normal travel path, said clutch comprising,
- a roller retention cage adapted to be installed between said races, and,
- a plurality of accordion type energizing springs mounted to said cage, each of which has a series of flat leaves joined to an adjacent leaf at a resilient pleat in a general V shape, each of said springs being compressed against a respective roller so as to normally bias it toward an equilibrium position within said normal travel path, at least one of said spring leaves further including an auxiliary spring finger formed therefrom and extending toward an adjacent leaf from a resilient live hinge to a finger end spaced away from said adjacent leaf sufficiently far so as to contact said adjacent leaf only when said roller moves beyond said normal travel path,
- whereby, when said finger end contacts said adjacent leaf, said finger bends about said live hinge to create additional resilient force on said roller, thereby protecting the pleat between said leaves against overcompression as well as providing additional spring force to restore said roller to said normal travel path.

3. In an overrunning roller clutch including a plurality of rollers located between a pair of clutch races, each of which travels back and forth over a normal travel path, but is subject to disturbing forces moving it beyond said normal travel path, said clutch further including a plurality of accordion type energizing springs, each of which has a series of flat leaves joined to an adjacent leaf in a general V shape at a resilient pleat, each of said springs further being compressed against a respective roller so as to normally bias it toward an equilibrium position within said normal travel path, the improvement comprising,
- an auxiliary spring finger formed from at least one of said spring leaves and extending toward an adjacent leaf from a resilient live hinge to a finger end spaced away from said adjacent leaf sufficiently far so as to contact said adjacent leaf only when said roller moves beyond said normal travel path,
- whereby, when said finger end contacts said adjacent leaf, said finger bends about said live hinge to create additional resilient force on said roller, thereby protecting the pleat between said leaves against overcompression as well as providing additional spring force to restore said roller to said normal travel path.

* * * * *